M. W. POTTER.
PORTABLE OVEN.
APPLICATION FILED JAN. 10, 1916.
1,199,605.
Patented Sept. 26, 1916.
2 SHEETS—SHEET 1.
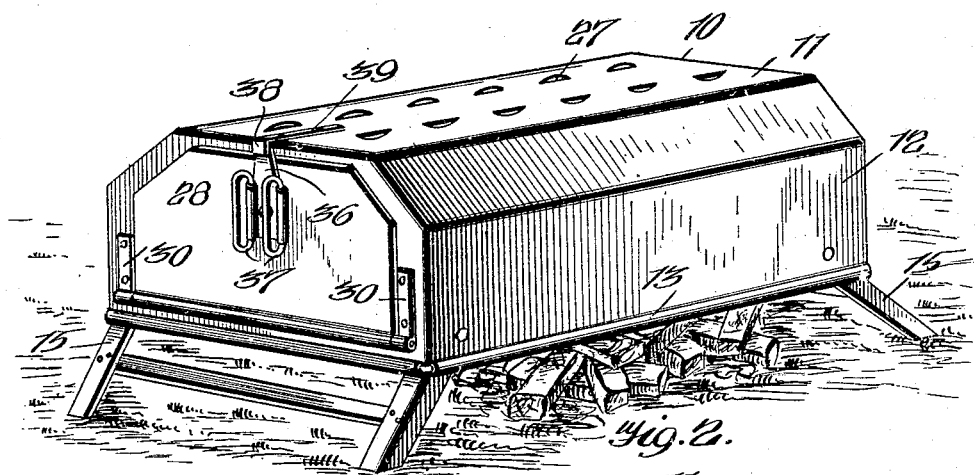
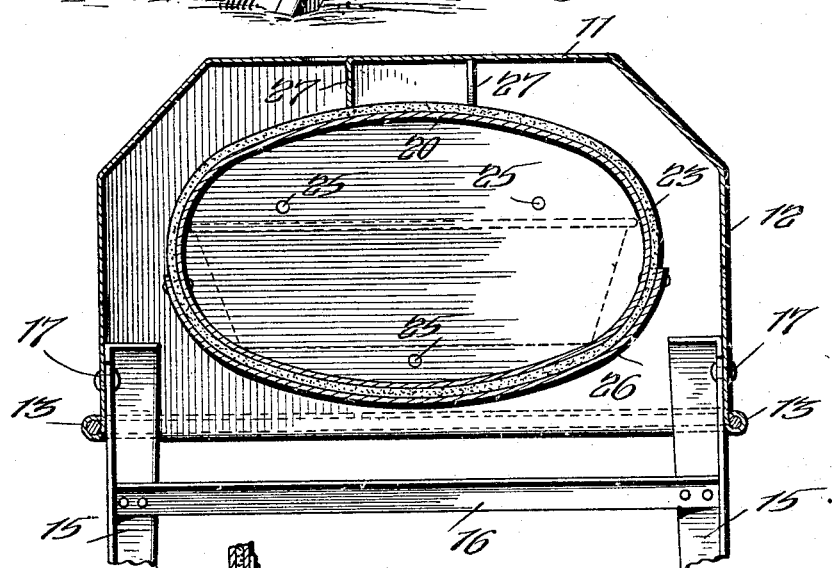
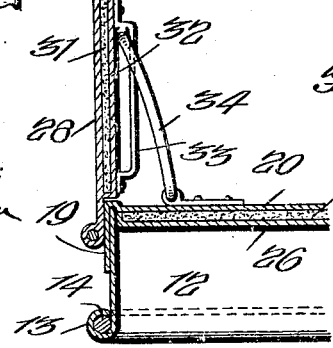
WITNESSES:
E. W. Callaghan
W. E. Beck
INVENTOR
MILTON W. POTTER,
BY Munn & Co.
ATTORNEYS

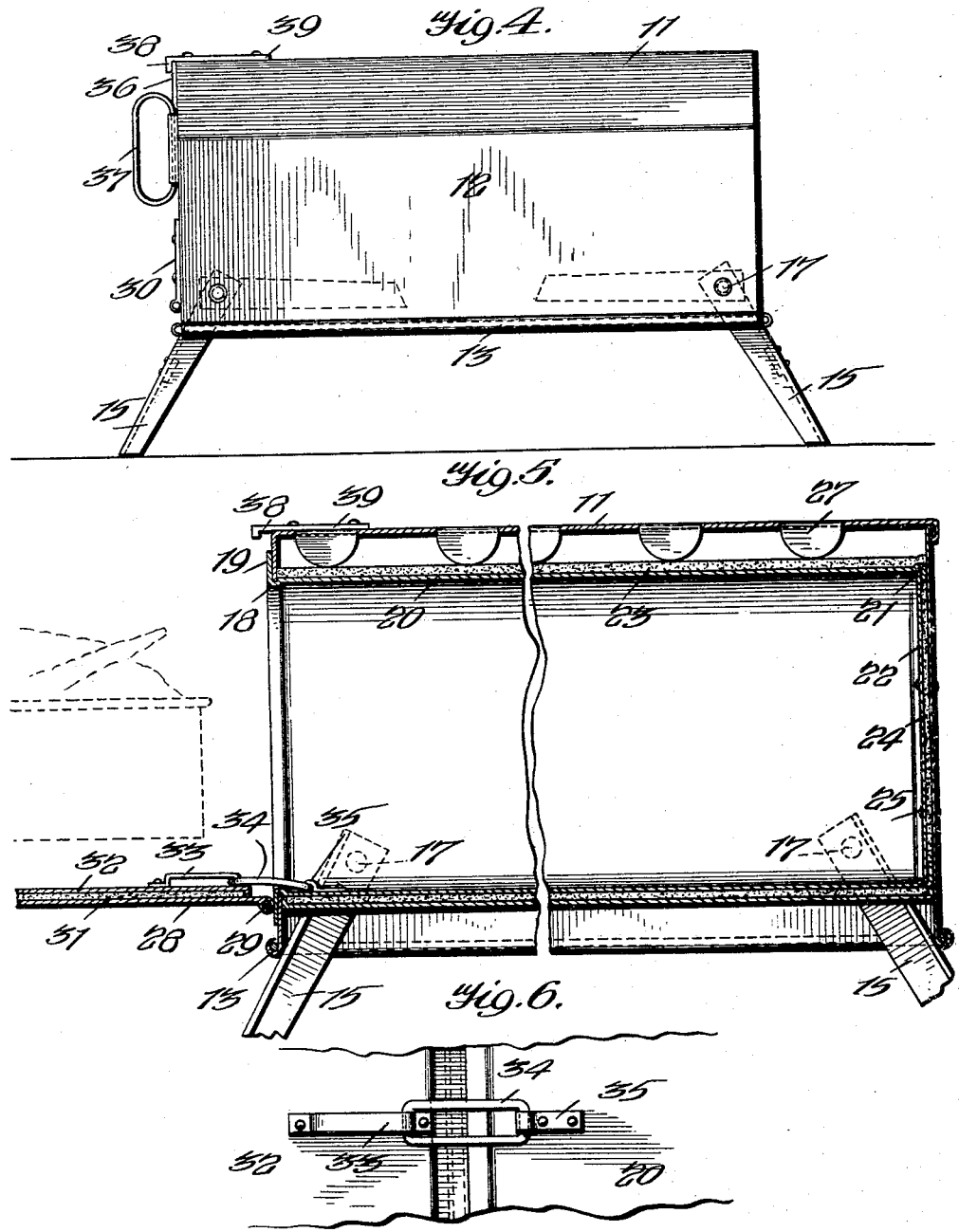

UNITED STATES PATENT OFFICE.

MILTON WILLIAM POTTER, OF RED LODGE, MONTANA.

PORTABLE OVEN.

1,199,605.  Specification of Letters Patent.  Patented Sept. 26, 1916.

Application filed January 10, 1916. Serial No. 71,263.

*To all whom it may concern:*

Be it known that I, MILTON W. POTTER, a citizen of the United States, and a resident of Red Lodge, in the county of Carbon and State of Montana, have invented an Improvement in Portable Ovens, of which the following is a specification.

This invention is an improvement in ovens and has particular reference to an oven of the portable type generally used in field service.

An object of the invention is to provide an oven of this character consisting of an outer hood or casing provided with an insulated door and having mounted therein an inner insulated casing elliptical in cross section so that the bake pan will be supported only upon its longitudinal edges to provide sufficient air space thereabout to prevent food from burning.

Another object is the provision of a plurality of depending elements struck from the top of the outer hood or casing and engaging the top of the inner casing whereby to support said top and prevent the same from being bent or buckled inwardly by the weight of cooking utensils or the like which might be placed thereon.

The inventive idea involved is capable of receiving a variety of mechanical expressions, one of which, for the purpose of illustrating the invention, is shown in the accompanying drawings, in which—

Figure 1 is a perspective view of the oven constructed in accordance with the invention. Fig. 2 is a transverse sectional view thereof. Fig. 3 is a fragmentary longitudinal section of the oven and door therefor. Fig. 4 is a side elevation of the oven with the door closed. Fig. 5 is a longitudinal sectional view with the door open. Fig. 6 is a plan view of the mounting for the door.

Referring more particularly to the drawings the numeral 10 indicates generally the outer hood or casing of the oven and including a top 11 and sides 12. The bottom edges of the hood 10 are preferably rolled as indicated at 13 to receive therein a reinforcing rod 14. The hood is preferably of substantially rectangular formation and is provided at each corner thereof with a supporting leg 15 connected by transverse braces 16. These legs are pivoted to the inner sides of the hood at 17 and when in supporting position the same engage the bottom rolled portions 13 of the ends of said hood as shown in Fig. 4. By swinging the legs 15 to the dotted line position shown in Fig. 4 the structure may be made more compact for transportation.

The front end of the hood 10 is provided with a door opening 18, the body portion of the hood around said opening engaging the front flange end 19 of the inner casing 20 the rear end of which is flanged and crimped as indicated at 21 to receive the rear wall 22. The inner casing 20 is preferably of elliptical formation and is provided with an outer lining of insulation 23, preferably asbestos, the rear wall 22 being also provided with an asbestos lining 24 secured to the outer surface thereof by means of rivets 25 which pass through said rear wall 22, insulation 24 and the rear wall of the outer hood 10 whereby the inner casing 20 is securely supported within the hood. The bottom portion of the asbestos lining 23 has secured thereto a protective plate 26 which is adapted to prevent flames from too quickly destroying the insulation. The casing 20 is preferably elliptical so that when a bake pan, shown in dotted lines in Fig. 2, is inserted thereinto the longitudinal edges of said pan only will rest upon the bottom portion of the casing thus providing a sufficient space around said pan to permit of proper air circulation thereabout.

The top 11 of the hood 10 is preferably flat and provided longitudinally thereof with a plurality of struck out portions in the form of lugs 27 arranged in staggered relation and substantially semi-circular formation, said lugs depending from the top and adapted to engage the top of the insulation 23, as best shown in Fig. 5, whereby the top 11 is prevented from being bent or buckled when cooking utensils or the like are placed thereon.

A door 28 is provided for the opening 18 and it is pivoted upon the rod 29 mounted in bearings 30 secured to the end of the hood 10. This door is also provided with an interposed lining 31 of insulation by means of a plate 32 to which is secured the bracket 33. This bracket receives one end of a link 34 the other end of which is pivoted to a bearing 35 secured to the casing 20 adjacent the opening 18. When the door is in open position, as shown in Fig. 5, the link 34 is adapted to retain said door in a substantially horizontal plane and when the latter is closed the link 34 will slide to the other end of the bracket 33 as shown in Fig. 3. In order to retain the door 28 in closed position the same is provided with a latch 36 provided with a pair of handles 37, said latch being pivoted to the door and adapted to have its extremity engage the depending lug 38 of an arm 39 secured to the top 11 of the hood 10. When it is desired to open the door the handle 37 may be grasped and the latch 36 swung about its pivot so as to disengage the extremity thereof from said lug 38 whereupon said door may be swung upon its pivot to the position shown in Fig. 5.

What is claimed is:

An oven comprising an outer hood member having an open bottom and a flat top, rows of supporting lugs arranged longitudinally of and struck inwardly from said top in staggered relation, an inner casing mounted in the hood, an insulating lining surrounding said casing and contacting with the bottom edges of said lugs whereby the top of the hood is prevented from sagging, and a protective plate covering the bottom portion of said lining.

MILTON WILLIAM POTTER.

Witness:
E. B. PROVINSE.

Copies of this patent may be obtained for five cents each, by addressing the "Commissioner of Patents Washington, D. C."